T. F. McCafferty.
Bee Hive.
N° 88,315.    Patented Mar. 30, 1869.
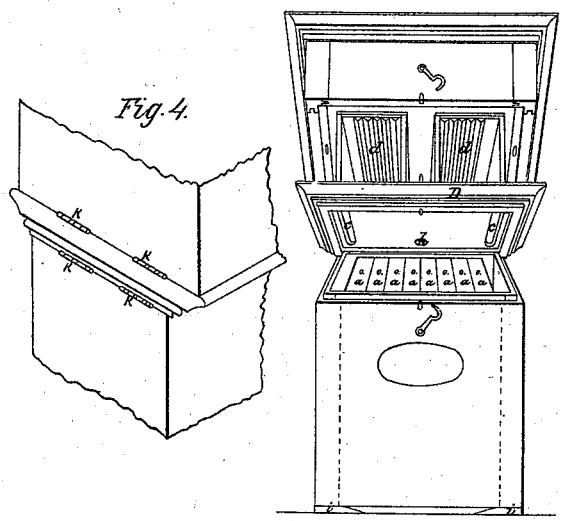
Fig. 1.
Fig. 4.
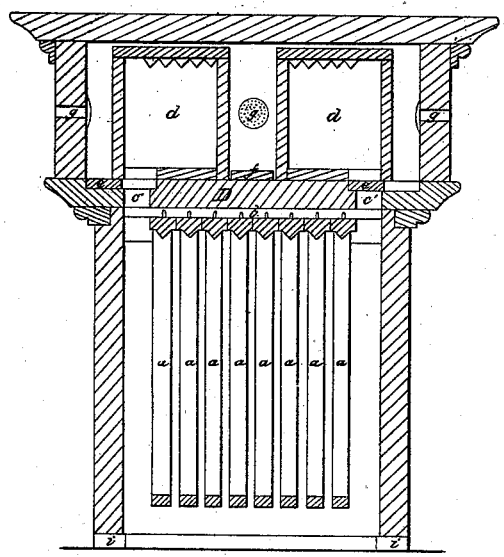
Fig. 2.
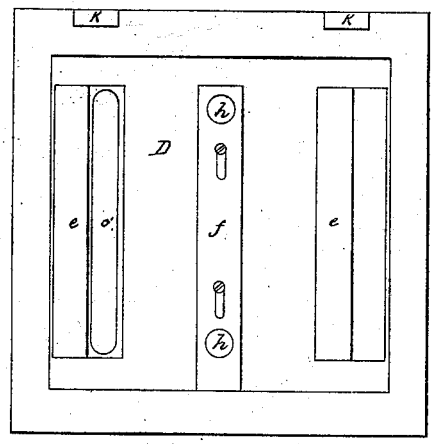
Fig. 3.
Witnesses
Inventor
T. F. McCafferty

T. F. McCAFFERTY, OF COLUMBUS, OHIO.

Letters Patent No. 88,315, dated March 30, 1869.

IMPROVEMENT IN BEE-HIVES.

The Schedule referred to in these Letters Patent and making part of the same.

*To all whom it may concern:*

Be it known that I, T. F. McCAFFERTY, of Columbus, county of Franklin, and State of Ohio, have invented certain new and useful Improvements in Bee-Hives; and I do hereby declare that the following is a full, clear, and exact description of the same, reference being had to the accompanying drawings, making a portion of this specification, in which—

Figure I is a front view of the hive, with the cover and honey-board raised.

Figure II is a central section, showing the several apartments of the same.

Figure III is a top view of the honey-board, showing the different slides in their respective places.

Figure IV is a view of part of the back of the hive, showing the hinges of the cap and honey-board.

Similar letters of reference indicate corresponding parts in all the figures.

The object of this invention is to produce a better degree of health, and promote the longevity of the bee; also to have access to the several apartments of the hive, without the knowledge of the bee.

The invention consists in the construction of bee-hives with hinged honey-board, to have long openings, one in each side, beneath the honey-box. In connection with these openings, I provide slides, of sufficient size, which are so arranged that they may be adjusted, which will enable, when desired, the apiarian to take away the surplus honey without the knowledge of the bees. The aforesaid honey-board is hinged to the top of the main hive, and, by raising it, gives access to the comb-frames.

The invention further consists in other holes and slide, for the purpose of ventilating the hive in winter-season. These holes and slide are placed between the honey-boxes, the holes being one-half inch in size, which are made in the honey-board. There can be two, or more, with a slide of sufficient length to cover the holes, there being holes in the slide, to correspond with the holes in the honey-board, so arranged as to ventilate, or shut out the ventilation, by adjusting the slide.

The invention further consists in the combination, with the slide and holes, to admit of ventilation from the top, of the foot-blocks, which are placed under the hive during summer, and are removed in winter-season. The foot-blocks, being removed, stop the ventilation of the hive from the bottom, and, by opening the ventilating-slide, cause the ventilation to come from the top, through suitable holes in the top cover, and thence to the main hive, through the ventilating-holes in the slide above cited.

To enable others to understand the nature and construction of my invention, I will proceed to describe it with reference to the drawings.

Letters *a a* are the comb-frames—the same as are seen in other hives—seen in Figs. I and II.

Letters *b b* are the air-chamber between the honey-board D and the comb-frames *a a*.

Letters *c c* are the openings to admit the bees into the honey-boxes, seen in Figs. I and II, the same being used in other hives.

Letters B B are the honey-boxes, the same as in common hives.

Letter D is the honey-board, which is hinged, at one end, to the main body of the hive, and contains holes *h h* and openings *c c;* also slides *e, e,* and *f,* seen in Fig. III.

Letters *e e* are the slides, under the honey-boxes, used to open and close the openings *c c*, seen in Fig. III.

Letter *f* is the slide used to ventilate the hive when the foot-blocks *i i* are removed in winter-season, and is closed when the foot-blocks are under the hive in summer-season.

Letters *g g* are the holes in the top cover of the hive, for the purpose of supplying the ventilator *f,* or, in other words, the holes in slide *f,* with fresh air, and also permit the over amount of animal-heat and gases to escape without condensing.

Letters *h h* are the holes in slide *f,* for ventilators, used for winter-ventilation, seen in Fig. III.

Letters *i i* are the foot-blocks, which are placed under the hive in summer, and are removed in winter-seasons, shown in Figs. I and II.

Letters *k k* are the hinges which fasten the honey-board to the hive, and the top cover to the honey-board.

What I claim as my invention, and desire to secure by Letters Patent, is—

1. The honey-board D, when provided with slides *e, e,* and *f,* and covering openings *c, c,* and *h,* substantially as described, and for the purpose specified.

2. The slide *f* and openings *h,* to admit of ventilation from the top, as set forth.

3. In combination with the slide *f* and openings *h,* the removable foot-blocks *i i,* as shown and described.

Witnesses:  T. F. McCAFFERTY.
  SAM. GULICK,
  SAMUEL P. BARTLEY.